US009510016B2

(12) United States Patent
Gomila et al.

(10) Patent No.: US 9,510,016 B2
(45) Date of Patent: Nov. 29, 2016

(54) METHODS AND APPARATUS FOR VIDEO CODING AND DECODING WITH REDUCED BIT-DEPTH UPDATE MODE AND REDUCED CHROMA SAMPLING UPDATE MODE

(75) Inventors: Cristina Gomila, Princeton, NJ (US); Oscar Divorra Escoda, Barcelona (ES); Peng Yin, Ithaca, NY (US); Joel Sole, Plainsboro, NJ (US)

(73) Assignee: Thomson Licensing (FR)

( * ) Notice: Subject to any disclaimer, the term of this patent is extended or adjusted under 35 U.S.C. 154(b) by 365 days.

(21) Appl. No.: 12/737,132

(22) PCT Filed: Jun. 11, 2009

(86) PCT No.: PCT/US2009/003514
§ 371 (c)(1),
(2), (4) Date: Dec. 10, 2010

(87) PCT Pub. No.: WO2009/151615
PCT Pub. Date: Dec. 17, 2009

(65) Prior Publication Data
US 2011/0096839 A1    Apr. 28, 2011

Related U.S. Application Data

(60) Provisional application No. 61/060,938, filed on Jun. 12, 2008.

(51) Int. Cl.
*H04N 7/12*    (2006.01)
*H04N 19/59*    (2014.01)
(Continued)

(52) U.S. Cl.
CPC ............ *H04N 19/59* (2014.11); *H04N 19/102* (2014.11); *H04N 19/157* (2014.11); *H04N 19/184* (2014.11); *H04N 19/186* (2014.11); *H04N 19/61* (2014.11)

(58) Field of Classification Search
CPC .... H04N 19/59; H04N 19/61; H04N 19/102; H04N 19/157; H04N 19/184; H04N 19/186
USPC .......................................... 375/240
See application file for complete search history.

(56) References Cited

U.S. PATENT DOCUMENTS 6,819,395 B2    11/2004    Werner
7,787,704 B2 *    8/2010    Daly et al. .............. 382/261
(Continued)

FOREIGN PATENT DOCUMENTS

JP    2007528675    10/2007
JP    2008-518516    5/2008
(Continued)

OTHER PUBLICATIONS

Segall et al.:"New Results with the Tone Mapping SEI Message," Joint Video team (JVT) of ISO/IEC MPEG & ITU-T VCEG, Oct. 20, 2006, pp. 1-8.
(Continued)

*Primary Examiner* — Allen Wong
(74) *Attorney, Agent, or Firm* — Jack Schwartz & Associates, PLLC

(57) ABSTRACT

Methods and apparatus are provided for video coding and decoding with reduced bit-depth update mode and reduced chroma sampling update mode. An apparatus includes an encoder for encoding at least a portion of a picture using at least one of a reduced bit-depth update mode and a reduced chroma sampling update mode that respectively reduces at least one of a bit-depth and a chroma sampling of a residue signal corresponding to the portion.

16 Claims, 7 Drawing Sheets

(51) Int. Cl.
 *H04N 19/102* (2014.01)
 *H04N 19/61* (2014.01)
 *H04N 19/186* (2014.01)
 *H04N 19/157* (2014.01)
 *H04N 19/184* (2014.01)

(56) References Cited

U.S. PATENT DOCUMENTS

| | | |
|---|---|---|
| 2005/0063471 A1 | 3/2005 | Regunathan et al. |
| 2005/0259729 A1 | 11/2005 | Sun |
| 2007/0098083 A1 | 5/2007 | Visharam et al. |
| 2007/0189392 A1 | 8/2007 | Tourapis et al. |
| 2007/0195887 A1 | 8/2007 | Comer et al. |
| 2008/0031518 A1* | 2/2008 | Song .............. H04N 19/176 382/166 |
| 2009/0074060 A1* | 3/2009 | Kim et al. .......... 375/240.12 |
| 2009/0219994 A1* | 9/2009 | Tu et al. ............ 375/240.08 |
| 2010/0020866 A1* | 1/2010 | Marpe ............ H04N 19/00569 375/240.02 |
| 2010/0260260 A1* | 10/2010 | Wiegand et al. ...... 375/240.12 |
| 2011/0090959 A1* | 4/2011 | Wiegand et al. ...... 375/240.12 |

FOREIGN PATENT DOCUMENTS

| | | |
|---|---|---|
| JP | 2008515350 | 5/2008 |
| KR | 2006-0134976 A | 12/2006 |
| WO | WO2007089696 | 8/2007 |
| WO | WO2008049446 | 5/2008 |

OTHER PUBLICATIONS

Winken et al.:"SVC Bit Depth Scalability," Joint Video team (JVT) of ISO/IEC MPEG & ITU-T VCEG, Jan. 13, 2007, pp. 1-14.
Segall:"Upsampling and Down-Sampling for Spatial Scalability," Joint Video team (JVT) of ISO/IEC MPEG & ITU-T VCEG, Jan. 14, 2006, pp. 1-12.
Y. Gao et al., "Bit Depth Scalability", Joint Video Team (JVT) of ISO/IEC MPEG & ITU-T VCEG (ISO/IEC JTC1/SC29/WG11 and ITU-T SG16 Q.6), 22nd Meeting: Marrakech, Morocco, pp. 1-11, Jan. 13-19.
Y. Gao et al., "Applications and Requirement for Color Bit Depth Scalability", Joint Video Team (JVT) of ISO/IEC MPEG & ITU-T VCEG (ISO/IEC JTC1/SC29/WG11 and ITU-T SG16 Q.6), 21st Meeting: Hangzhou, China pp. 1-5, Oct. 20-27, 2006.
Rijkse: "Video Coding for Low Bit Rate Communication" ITU_T_Draft_Recommendation_H263, Feb. 6, 1998.
ITU-T Rec. H264, "Advanced Video Coding for Generic Audiovisual Services" 2005.

* cited by examiner

METHODS AND APPARATUS FOR VIDEO CODING AND DECODING WITH REDUCED BIT-DEPTH UPDATE MODE AND REDUCED CHROMA SAMPLING UPDATE MODE

CROSS-REFERENCE TO RELATED APPLICATIONS

This application claims the benefit, under 35 U.S.C. §365 of International Application PCT/US2009/003514 and filed Jun. 11, 2009, which was published in accordance with PCT Article 21(2) on Dec. 17, 2009, in English, and which claims the benefit of U.S. Provisional Patent Application No. 61/060,938, filed on Jun. 12, 2008, in English, which are incorporated by reference in their respective entireties.

TECHNICAL FIELD

The present principles relate generally to video encoding and decoding and, more particularly, to methods and apparatus for video coding and decoding with reduced bit-depth update mode and reduced chroma sampling update mode.

BACKGROUND

Currently, requests for higher quality multimedia are rapidly increasing. Professional applications including, but not limited to, digital cinema, digital broadcast delivery, and post production, require very high fidelity. High quality consumer applications are also increasing with the support of large and vivid flat panel displays and the availability of high quality contents. To respond to the demands for a compression technology appropriate for high quality video applications, the standardization of professional profiles for the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard") has been completed by the Joint Video Team (JVT) of MPEG and ITU-T. These professional profiles have been developed to serve applications in the professional and semi-professional domains with enhanced compression capabilities for color sampling structures ranging up to 4:4:4 and bit depth dynamic ranges up to 14 bits per sample. When the content is coded using a higher bit depth and higher chroma sampling, the bitrate assumption increases dramatically.

The MPEG-4 AVC Standard is the latest video coding standard capable of providing good video quality at substantial lower bit rates than previous standards, (e.g. half or less the bit rate of the ISO/IEC MPEG-2 Standard, the ITU-T H.263 Recommendation, and MPEG-4 Part 2). The MPEG-4 AVC Standard includes a number of new coding tools for efficient video compression. The key coding tools include multiple reference frames, spatial predictions for intra coding, a new transform design, variable block size prediction, an in-loop filter, ¼ pixel precision motion compensation, hierarchical B frames, weighted prediction, and logarithmic quantization step and quantization matrices. The MPEG-4 AVC Standard defines 11 profiles providing different coding tools for different applications. The High profile is the primary profile for broadcast and optical storage applications, particularly for high-definition television applications. The High 10 profile builds on top of the High profile by adding support for up to 10 bits per sample of decoded picture precision. The High 4:2:2 profile, which primarily targets professional applications that use interlaced video, builds on top of the High 10 profile by adding support for the 4:2:2 chroma sub-sampling format while using up to 10 bits per sample of decoded picture precision. The newly finalized Amendment 2 of the MPEG-4 AVC Standard defines five new profiles (the High 10 Intra, High 4:2:2 Intra, High 4:4:4 Intra, context-adaptive variable-length coding (CAVLC) 4:4:4 Intra, and High 4:4:4 Predictive profiles) intended primarily for professional and high quality applications and two new types of supplemental enhancement information (SEI) messages (the post-filter hint SEI message and the tone mapping information SEI message). These profiles and supplemental enhancement information messages are designed to serve high quality video applications with enhanced compression capabilities for color sampling structures ranging up to 4:4:4 and bit depth dynamic ranges up to 14 bits per sample.

Turning to FIG. 1, relations and capabilities of the set of MPEG-4 AVC Standard profiles are indicated generally by the reference numeral 100. A first loop 110 corresponds to the Baseline profile, a second loop 120 corresponds to the Extended profile, a third loop 130 corresponds to the Main profile, a fourth loop 140 corresponds to the High profile, a fifth loop 150 corresponds to the High 10 profile, a sixth loop 160 corresponds to the High 4:2:2 profile, and a seventh loop 170 corresponds to the High 4:4:4 profile. The first loop 110 capabilities include arbitrary slice ordering (ASO), I and P slices, redundant pictures, motion-compensated prediction, context-adaptive variable-length coding (CAVLC), in-loop deblocking, intra prediction, and flexible macroblock ordering (FMO). The second loop 120 includes SI and SP slices, B slices, field coding, macroblock level adaptive frame/field (MBAFF), weighted prediction, data partitioning, and the elements included in the first loop 110. The third loop 130 includes B slices, field coding, context-adaptive binary arithmetic coding (CABAC), MBAFF, weighted prediction, intra prediction, in-loop deblocking, motion-compensated prediction, and I and P slices. The fourth loop 140 includes 8×8 spatial prediction, 8×8 transforms, a monochrome format, scaling matrices, and the elements included in the third loop 130. The fifth loop 150 includes 8-10 bit sample depth and the elements included in the fourth loop 140. The sixth loop 160 includes a 4:2:2 chroma format and the elements in the fifth loop 150. The seventh loop 170 includes a 4:4:4 chroma format, an 8-14 bit sample depth, predictive lossless, and the elements included in the sixth loop 160.

The MPEG-4 AVC Standard only allows bit-depth adaptation and chroma sampling adaptation at the sequence level. In the Sequence Parameter Set (SPS), the MPEG-4 AVC Standard defines the following syntax elements using the following semantics:

chroma_format_idc specifies the chroma sampling relative to the luma sampling as specified in TABLE 1. The value of chroma_format_idc shall be in the range of 0 to 3, inclusive. When chroma_format_idc is not present, it shall be inferred to be equal to 1 (4:2:0 chroma format).

bit_depth_luma_minus8 specifies the bit depth of the samples of the luma array and the value of the luma quantization parameter range offset $QpBdOffset_Y$, as specified by the following:

$$BitDepth_Y = 8 + bit\_depth\_luma\_minus8$$
$$QpBdOffset_Y = 6 * bit\_depth\_luma\_minus8$$

When bit_depth_luma_minus8 is not present, it shall be inferred to be equal to 0. bit_depth_luma_minus8 shall be in the range of 0 to 6, inclusive.

bit_depth_chroma_minus8 specifies the bit depth of the samples of the chroma arrays and the value of the chroma quantization parameter range offset QpBdOffsetC, as specified by the following:

$$BitDepthC = 8 + bit\_depth\_chroma\_minus8$$
$$QpBdOffset_C = 6 * bit\_depth\_Chroma\_minus8$$

When bit_depth_chroma_minus8 is not present, it shall be inferred to be equal to 0. bit_depth_chroma_minus8 shall be in the range of 0 to 4, inclusive.

TABLE 1 shows SubWidthC and SubHeightC values derived from chroma_format_idc.

TABLE 1

| chroma_format_idc | Chroma Format | SubWidthC | SubHeightC |
|---|---|---|---|
| 0 | monochrome | — | — |
| 1 | 4:2:0 | 2 | 2 |
| 2 | 4:2:2 | 2 | 1 |
| 3 | 4:4:4 | 1 | 1 |

The MPEG-4 AVC Standard allows sequence level adaptation of bit-depth and chroma-sampling. For example, we can transmit some scenes/groups of pictures (GOPs) with higher bit-depth/chroma-sampling and some others with lower bit-depth/chroma-sampling. Although this can reduce the bitrate of higher bit-depth and/or higher chroma-sampling video, it has several disadvantages. First, the flexibility is constrained to only the sequence level, which limits the adaptation according to picture type, image characteristics, and so forth. Second, since some scenes/GOPs use lower bit-depth/chroma-sampling and the display needs higher bit-depth/chroma-sampling, post processing is required to increase the bit-depth or chroma sampling for the final display.

SUMMARY

These and other drawbacks and disadvantages of the prior art are addressed by the present principles, which are directed to methods and apparatus for video coding and decoding with reduced bit-depth update mode and reduced chroma sampling update mode.

According to an aspect of the present principles, there is provided an apparatus. The apparatus includes an encoder for encoding at least a portion of a picture using at least one of a reduced bit-depth update mode and a reduced chroma sampling update mode that respectively reduces at least one of a bit-depth and a chroma sampling of a residue signal corresponding to the portion.

According to another aspect of the present principles, there is provided a method. The method includes encoding at least a portion of a picture using at least one of a reduced bit-depth update mode and a reduced chroma sampling update mode that respectively reduces at least one of a bit-depth and a chroma sampling of a residue signal corresponding to the portion.

According to yet another aspect of the present principles, there is provided an apparatus. The apparatus includes a decoder for decoding at least a portion of a picture using at least one of a reduced bit-depth update mode and a reduced chroma sampling update mode that respectively increases at least one of a bit-depth and a chroma sampling of a residue signal corresponding to the portion.

According to still another aspect of the present principles, there is provided a method. The method includes decoding at least a portion of a picture using at least one of a reduced bit-depth update mode and a reduced chroma sampling update mode that respectively increases at least one of a bit-depth and a chroma sampling of a residue signal corresponding to the portion.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
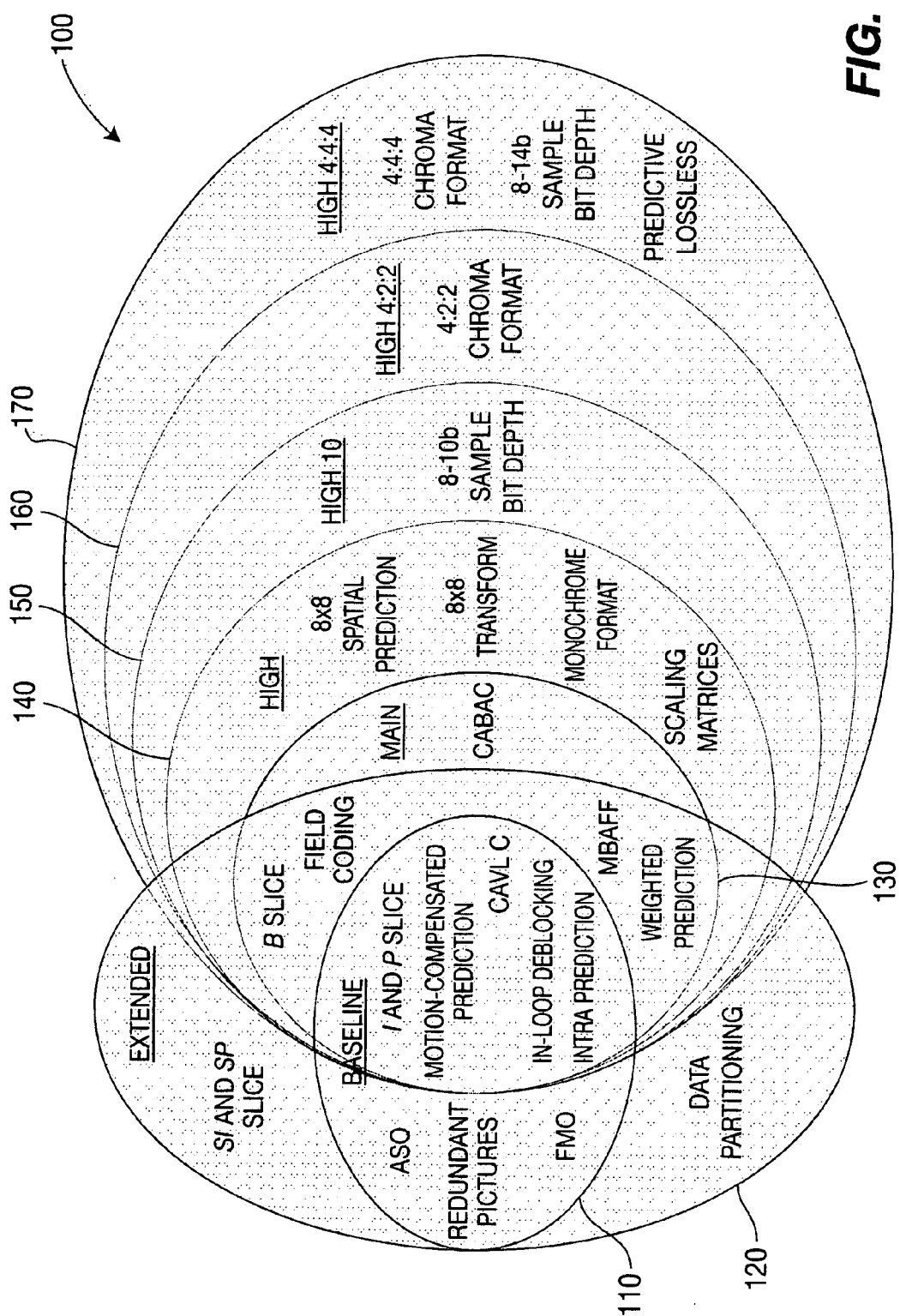
FIG. 1 is a diagram showing relations and capabilities of the set of MPEG-4 AVC Standard profiles to which the present principles may be applied.

The present principles are directed to methods and apparatus for video coding and decoding with reduced bit-depth update mode and reduced chroma sampling update mode.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Figure 2:
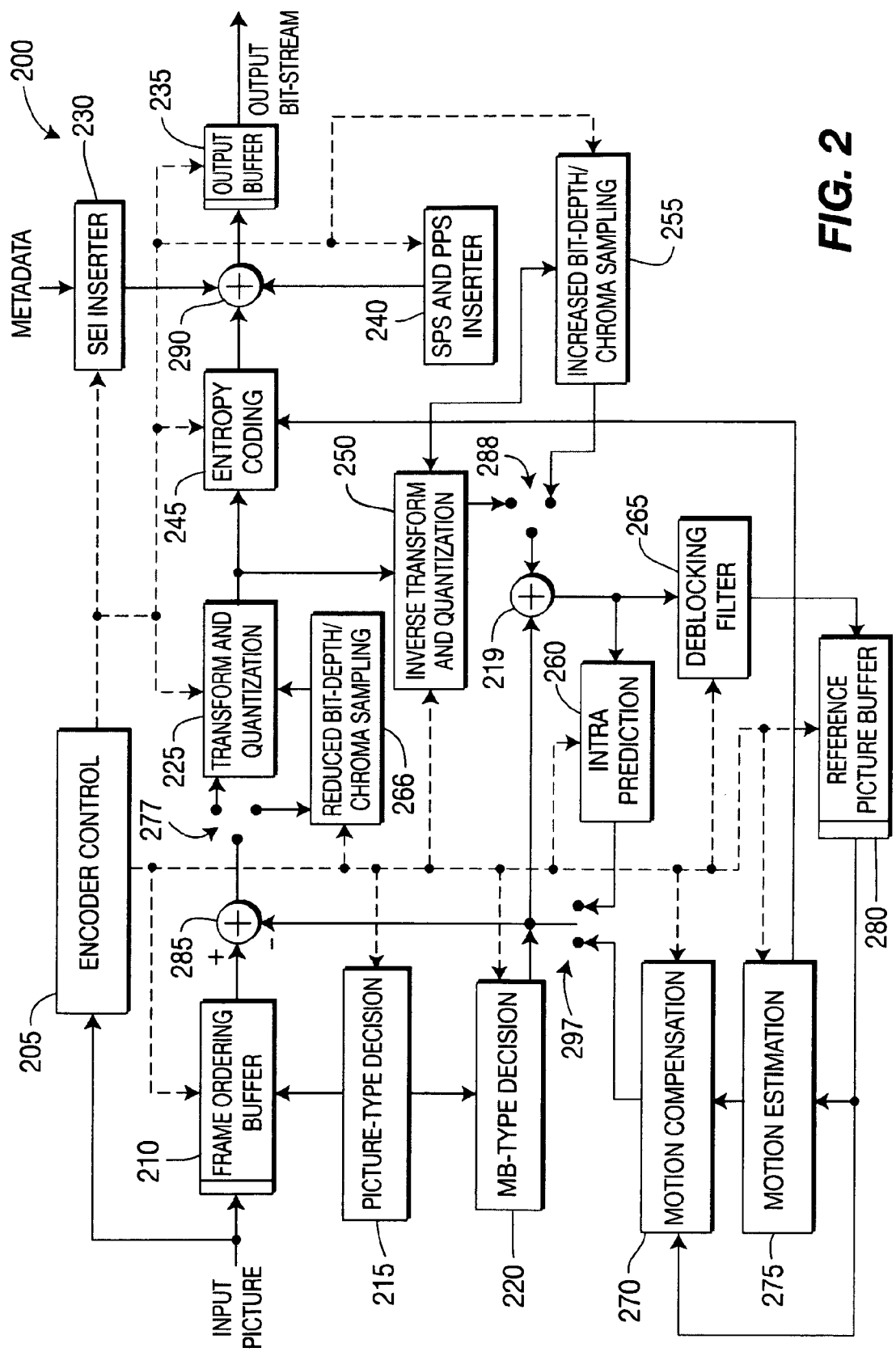
FIG. 2 is a block diagram showing an exemplary MPEG-4 AVC Standard based video encoder with a reduced bit-depth update mode and a reduced chroma sampling update mode, in accordance with an embodiment of the present principles.

Turning to FIG. 2, an exemplary MPEG-4 AVC Standard based video encoder with a reduced bit-depth update mode and a reduced chroma sampling update mode is indicated generally by the reference numeral 200.

The video encoder 200 includes a frame ordering buffer 210 having an output in signal communication with a non-inverting input of a combiner 285. An output of the combiner 285 is connected in signal communication with an input of a switch 277. A first output of the switch 277 is connected in signal communication with a first input of a transformer and quantizer 225. A second output of the switch 277 is connected in signal communication with a second input of a reduced bit-depth/chroma sampling device 266. An output of the transformer and quantizer 225 is connected in signal communication with a first input of an entropy coder 245 and a first input of an inverse transformer and inverse quantizer 250. An output of the entropy coder 245 is connected in signal communication with a first non-inverting input of a combiner 290. An output of the combiner 290 is connected in signal communication with a first input of an output buffer 235.

A first output of an encoder controller 205 is connected in signal communication with a second input of the frame ordering buffer 210, a second input of the inverse transformer and inverse quantizer 250, an input of a picture-type decision module 215, a first input of a macroblock-type (MB-type) decision module 220, a second input of an intra prediction module 260, a second input of a deblocking filter 265, a first input of a motion compensator 270, a first input of a motion estimator 275, a second input of a reference picture buffer 280, and a first input of the reduced bit-depth/chroma sampling device 266. An output of the reduced bit-depth/chroma sampling device 266 is connected in signal communication with a third input of the transformer and quantizer 225.

A second output of the encoder controller 205 is connected in signal communication with a first input of a Supplemental Enhancement Information (SEI) inserter 230, a second input of the transformer and quantizer 225, a second input of the entropy coder 245, a second input of the output buffer 235, an input of the Sequence Parameter Set (SPS) and Picture Parameter Set (PPS) inserter 240, and a first input of an increased bit-depth/chroma sampling device 255.

An output of the SEI inserter 230 is connected in signal communication with a second non-inverting input of the combiner 290.

A first output of the picture-type decision module 215 is connected in signal communication with a third input of a frame ordering buffer 210. A second output of the picture-type decision module 215 is connected in signal communication with a second input of a macroblock-type decision module 220.

An output of the Sequence Parameter Set (SPS) and Picture Parameter Set (PPS) inserter 240 is connected in signal communication with a third non-inverting input of the combiner 290.

A first output of the inverse quantizer and inverse transformer 250 is connected in signal communication with a first input of a switch 288. An output of the switch 288 is connected in signal communication with a first non-inverting input of a combiner 219. An output of the increased bit-depth/chroma sampling device 255 is connected in signal communication with a second input of the switch 288. A second output of the inverse quantizer and inverse transformer 250 is connected in signal communication with a second input of the increased bit-depth/chroma sampling device 255. An output of the combiner 219 is connected in signal communication with a first input of the intra prediction module 260 and a first input of the deblocking filter 265. An output of the deblocking filter 265 is connected in signal communication with a first input of a reference picture buffer 280. An output of the reference picture buffer 280 is connected in signal communication with a second input of the motion estimator 275 and a third input of the motion compensator 270. A first output of the motion estimator 275 is connected in signal communication with a second input of the motion compensator 270. A second output of the motion estimator 275 is connected in signal communication with a third input of the entropy coder 245.

An output of the motion compensator 270 is connected in signal communication with a first input of a switch 297. An output of the intra prediction module 260 is connected in signal communication with a second input of the switch 297. An output of the macroblock-type decision module 220 is connected in signal communication with a third input of the switch 297. The third input of the switch 297 determines whether or not the "data" input of the switch (as compared to the control input, i.e., the third input) is to be provided by the motion compensator 270 or the intra prediction module 260. The output of the switch 297 is connected in signal communication with a second non-inverting input of the combiner 219 and an inverting input of the combiner 285.

A first input of the frame ordering buffer 210 and an input of the encoder controller 205 are available as input of the encoder 200, for receiving an input picture. Moreover, a second input of the Supplemental Enhancement Information (SEI) inserter 230 is available as an input of the encoder 200, for receiving metadata. An output of the output buffer 235 is available as an output of the encoder 200, for outputting a bitstream.

Figure 3:
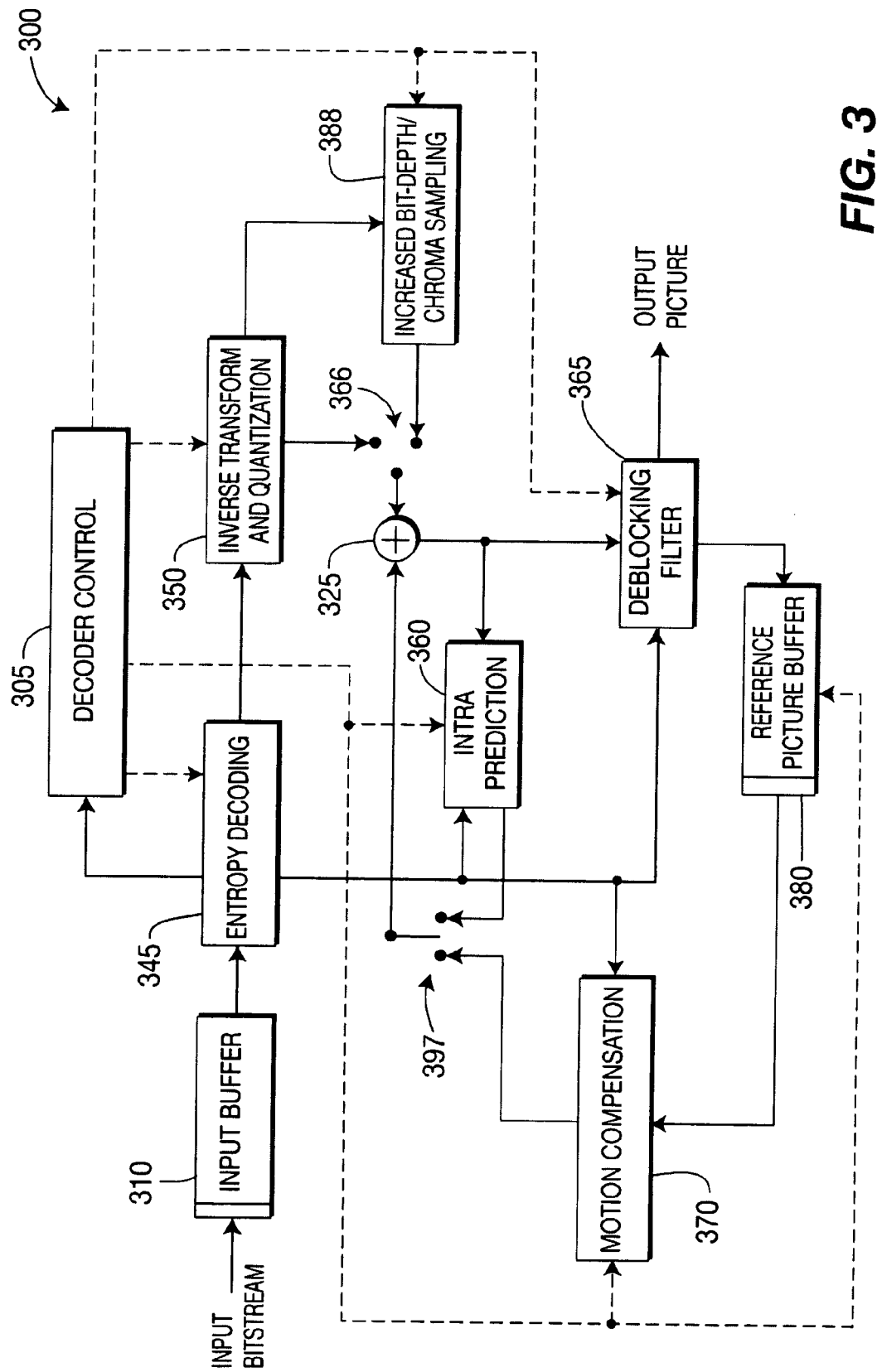
FIG. 3 is a block diagram showing an exemplary MPEG-4 AVC Standard based video decoder with a reduced bit-depth update mode and a reduced chroma sampling update mode, in accordance with an embodiment of the present principles.

Turning to FIG. 3, an exemplary MPEG-4 AVC Standard based video decoder with a reduced bit-depth update mode and a reduced chroma sampling update mode is indicated generally by the reference numeral 300.

The video decoder 300 includes an input buffer 310 having an output connected in signal communication with a first input of the entropy decoder 345. A first output of the entropy decoder 345 is connected in signal communication with a first input of an inverse transformer and inverse quantizer 350. A first output of the inverse transformer and inverse quantizer 350 is connected in signal communication with a first input of a switch 366. An output of the switch 366 is connected in signal communication with a second non-inverting input of a combiner 325. A second output of the inverse transformer and inverse quantizer 350 is connected in signal communication with a second input of the increased bit-depth/chroma sampling device 388. An output of the increased bit-depth/chroma sampling device 388 is connected in signal communication with a second input of the switch 366.

An output of the combiner 325 is connected in signal communication with a second input of a deblocking filter 365 and a first input of an intra prediction module 360. A second output of the deblocking filter 365 is connected in signal communication with a first input of a reference picture buffer 380. An output of the reference picture buffer 380 is connected in signal communication with a second input of a motion compensator 370.

A second output of the entropy decoder 345 is connected in signal communication with a third input of the motion compensator 370 and a first input of the deblocking filter 365. A third output of the entropy decoder 345 is connected in signal communication with an input of a decoder controller 305. A first output of the decoder controller 305 is connected in signal communication with a second input of the entropy decoder 345. A second output of the decoder controller 305 is connected in signal communication with a second input of the inverse transformer and inverse quantizer 350. A third output of the decoder controller 305 is connected in signal communication with a third input of the deblocking filter 365 and a first input of an increased bit-depth/chroma sampling device 388. A fourth output of the decoder controller 305 is connected in signal communication with a second input of the intra prediction module 360, a first input of the motion compensator 370, and a second input of the reference picture buffer 380.

An output of the motion compensator 370 is connected in signal communication with a first input of a switch 397. An output of the intra prediction module 360 is connected in signal communication with a second input of the switch 397. An output of the switch 397 is connected in signal communication with a first non-inverting input of the combiner 325.

An input of the input buffer 310 is available as an input of the decoder 300, for receiving an input bitstream. A first output of the deblocking filter 365 is available as an output of the decoder 300, for outputting an output picture.

As noted above, the present principles are directed to methods and apparatus for video coding and decoding with a reduced bit-depth update mode and a reduced chroma sampling update mode. The reduced bit-depth update mode is used to encode a picture at a reduced bit-depth, while performing prediction using a high bit-depth reference picture. The reduced chroma-sampling mode is used to encode a picture at a reduced chroma-sampling, while performing prediction using a high chroma-sampling. These two techniques allow the final image to be reconstructed at full bit-depth and/or full chroma-sampling and with good quality, although the bitrate to encode the picture is considerably decreased. Thus, embodiments of the present principles maintain high video quality, while at the same time considerably reducing bitrate.

In an embodiment using the proposed reduced bit-depth update mode and/or reduced chroma-sampling update mode, motion compensation/intra prediction is done at full bit-depth and/or full chroma-sampling, however the residue is coded at reduced bit-depth and/or reduced chroma-sampling. At the encoder, after prediction (motion compensation/intra prediction), the residue data first needs to be reduced to a lower bit-depth and/or a lower chroma-sampling and then transformation and quantization processes are performed, followed by entropy coding. At the decoder, after entropy decoding, de-quantization and inverse transformation, the residue data is increased to a higher bit-depth and/or a higher chroma-sampling. The residue data is then added to the prediction (motion compensation/intra prediction). It is to be appreciated that the present principles may be used with any of inter prediction (motion compensation) and intra prediction.

The processes of reducing the bit-depth and chroma-sampling are only done at the encoder, hence they are non-normative processes. Thus, the processes of the reducing the bit-depth and chroma sampling need not be known at the decoder.

However, the processes of increasing the bit-depth and chroma-sampling should be the same in both the encoder and decoder, as they are normative processes. For the reduced bit-depth update mode, in an embodiment, we allow the respective bit-depths of luma and chroma to be different.

For the process of reducing the bit-depth, in an embodiment, we can use a simple right shift. In another embodiment, tone mapping can be used. Of course, the present principles are not limited to solely the preceding techniques for reducing bit-depth and, thus, other techniques for reducing bit-depth may also be used, while maintaining the spirit of the present principles.

For the process of reducing the chroma-sampling, in an embodiment, we can use a simple average. In another embodiment, a more sophisticated filter including, but not limited to, for example, a Kaiser window approach or a Sinc window approach, can be used. Of course, the present principles are not limited to solely the preceding techniques for reducing chroma sampling and, thus, other techniques for reducing chroma sampling may also be used, while maintaining the spirit of the present principles.

For the process of increasing the bit-depth, in an embodiment, we can use a simple left shift. In another embodiment, inverse tone mapping can be used. Of course, the present principles are not limited to solely the preceding techniques for increasing bit-depth and, thus, other techniques for increasing bit-depth may also be used, while maintaining the spirit of the present principles.

For the process of increasing the chroma-sampling, in an embodiment, a simple bilinear upsampling filter can be used. In another embodiment, a more sophisticated filter including, but not limited to, for example, a wiener filter, can be used. Of course, the present principles are not limited to solely the preceding techniques for increasing chroma sampling and, thus, other techniques for increasing chroma sampling may also be used, while maintaining the spirit of the present principles.

The reduced bit-depth/chroma-sampling update mode can be any of supported, signaled, and/or derived at the block level, the macroblock level, the slice level, the picture level, and the sequence level.

In an embodiment, the reduced bit-depth/chroma-sampling update mode is supported at the slice level. For example, to maintain the best quality, in an embodiment, we enable the update mode only for non-reference pictures. For reference pictures, in an embodiment, the update mode is disabled.

TABLE 2 shows exemplary slice header syntax, in accordance with an embodiment of the present principles.

TABLE 2

| slice_header( ) { | C | Descriptor |
|---|---|---|
| first_mb_in_slice | 2 | ue(v) |
| slice_type | 2 | ue(v) |
| pic_parameter_set_id | 2 | ue(v) |
| frame_num | 2 | u(v) |
| reduced_bit_depth_update_flag | 2 | u(1) |
| if(reduced_bit_depth_update_flag) { | | |
| bit_depth_luma_minus8 | 2 | u(ev) |
| bit_depth_chroma_minus8 | 2 | u(ev) |
| } | | |
| reduced_chroma_sampling_update_flag | 2 | u(1) |
| if(reduced_chroma_sampling_update_flag) { | | |
| chroma_format_idc | 2 | u(ev) |
| } | | |
| ....... | | |

The semantics of some of the syntax elements included in TABLE 2 are as follows:

reduced_bit_depth_update_flag equal to 1 specifies that the reduced bit-depth update mode is enabled for this slice. reduced_bit_depth_update_flag equal to 0 specifies that the reduced bit-depth update mode is not enabled for this slice.

bit_depth_luma_minus_8 and bit_depth_chroma_minus_8 have the same semantics as in the MPEG-4 AVC Standard.

reduced_chroma_sampling_update_flag equal to 1 specifies that the reduced chroma-sampling update mode is enabled for this slice.

reduced_chroma_sampling_update_flag equal to 0 specifies that the reduced chroma-sampling update mode is not enabled for this slice.

Figure 4:
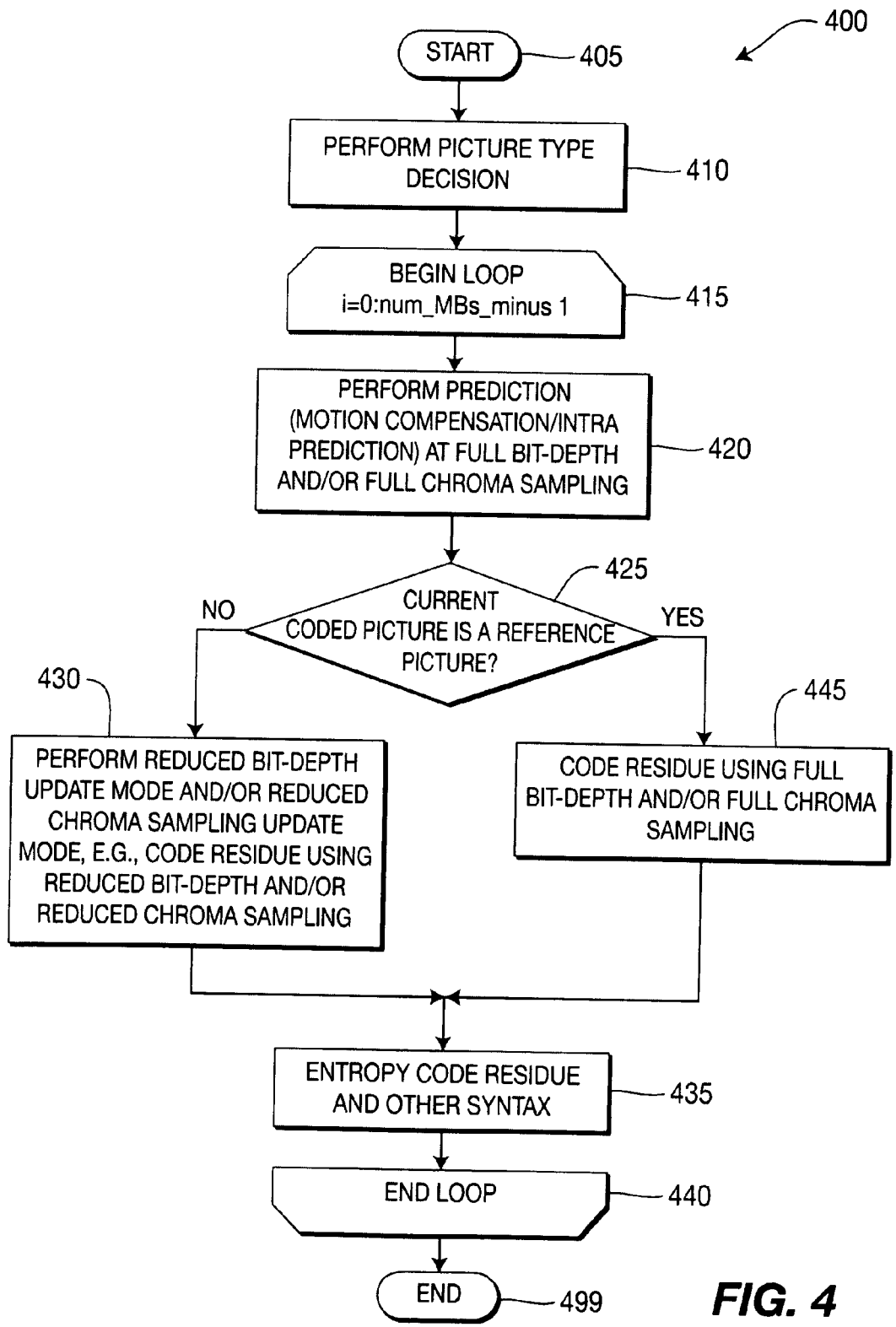
FIG. 4 is a flow diagram showing an exemplary method for video coding having a reduced bit-depth update mode and a reduced chroma sampling update mode based on coded picture type, in accordance with an embodiment of the present principles.

Turning to FIG. 4, an exemplary method for video coding having a reduced bit-depth update mode and a reduced chroma sampling update mode based on coded picture type is indicated generally by the reference numeral 400. The method 400 includes a start block 405 that passes control to a function block 410. The function block 410 performs a picture type decision process, and passes control to a loop limit block 415. The loop limit block 415 begins a loop over each macroblock in a current picture to be encoded, using a variable i with a range from zero to num_MBs_minus1, and passes control to a function block 420. The function 420 performs prediction (motion compensation/intra prediction) at full bit-depth/chroma sampling, and passes control to a decision block 425. The decision block 425 determines whether or not the current coded picture is a reference picture. If so, then control is passed to a function block 445. Otherwise, control is passed to a function block 430.

The function block 430 performs a reduced bit-depth update mode and/or reduced chroma sampling update mode, and passes control to a function block 435.

The function block 435 entropy encodes the residue and other syntax, and passes control to a loop limit block 440. The loop limit block 440 ends the loop, and passes control to an end block 499.

The function block 445 codes the residue using a full bit-depth and/or full chroma sampling, and passes control to the function block 435.

Figure 5:
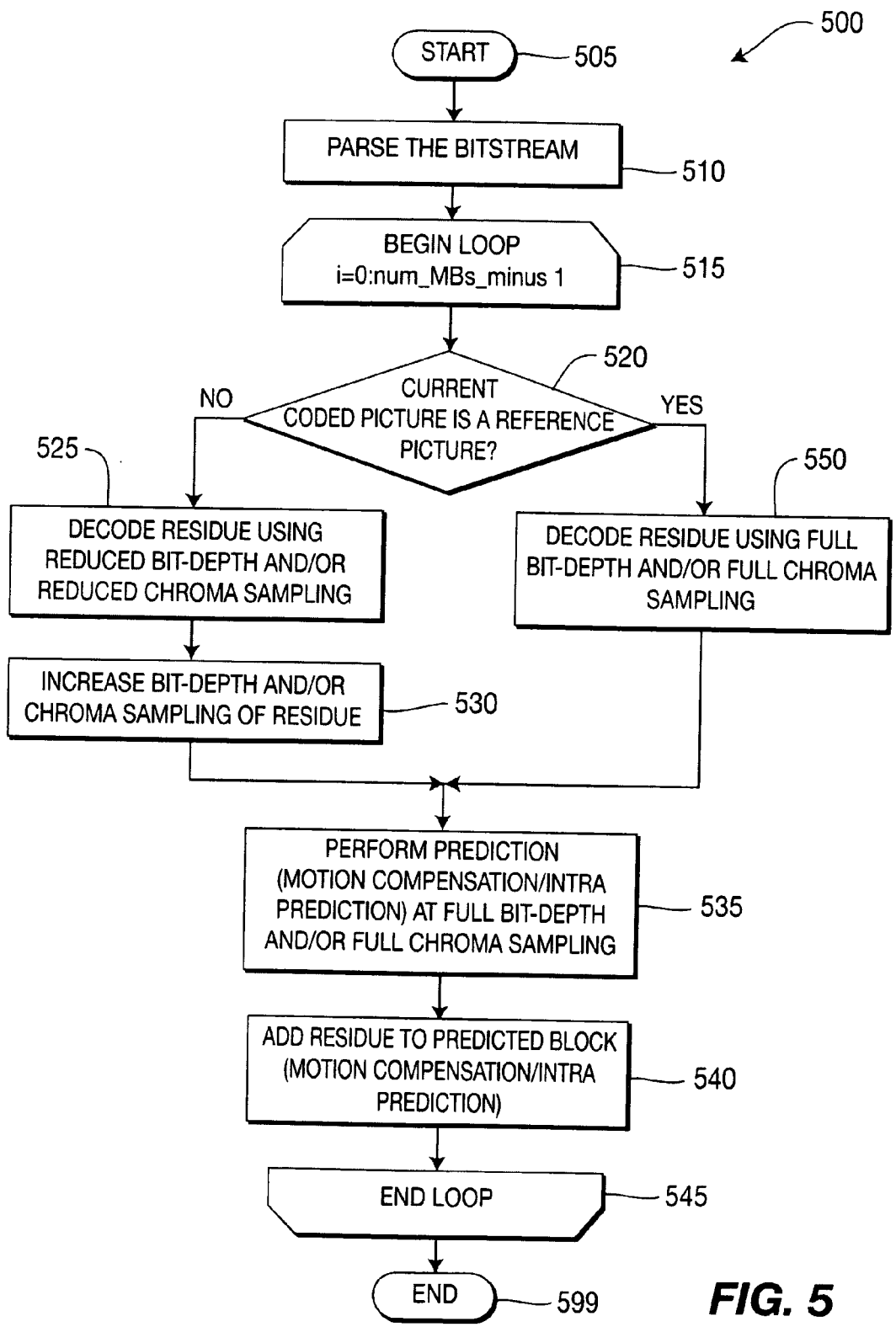
FIG. 5 is a flow diagram showing an exemplary method for video decoding having a reduced bit-depth update mode and a reduced chroma sampling update mode based on coded picture type, in accordance with an embodiment of the present principles.

Turning to FIG. 5, an exemplary method for video decoding having a reduced bit-depth update mode and a reduced chroma sampling update mode based on coded picture type is indicated generally by the reference numeral 500. The method 500 includes a start block 505 that passes control to a function block 510. The function block 510 parses the bitstream, and passes control to a loop limit block 515. The loop limit block 515 begins a loop over each macroblock in a current picture to be decoded, using a variable i with a range from zero to num_MBs_minus1, and passes control to a decision block 520. The decision block 520 determines whether or not the current coded picture is a reference picture. If so, then control is passed to a function block 550. Otherwise, control is passed to a function block 525.

The function block 525 decodes the residue using a reduced bit-depth or a reduced chroma sampling, and passes control to a function block 530. The function block 530 increases the bit-depth and/or chroma sampling of the residue, and passes control to a function block 535.

The function block 535 performs prediction (motion compensation/intra prediction) at full bit-depth/chroma sampling, and passes control to a decision block 540. The function block 540 adds the residue to the predicted block (with the latter obtained using motion compensation/intra prediction), and passes control to a loop limit block 545. The loop limit block 545 ends the loop, and passes control to an end block 599.

The function block 550 decodes the residue using a full bit-depth and/or full chroma sampling, and passes control to the function block 535.

In another embodiment, we can associate reduced bit-depth/chroma-sampling update mode with a reference index, as shown in TABLES 3-6.

TABLE 3 shows picture parameter set (PPS) syntax, in accordance with an embodiment of the present principles.

TABLE 3

| pic_parameter_set_rbsp( ) { | C | Descriptor |
|---|---|---|
| pic_parameter_set_id | 1 | ue(v) |
| seq_parameter_set_id | 1 | ue(v) |
| entropy_coding_mode_flag | 1 | u(1) |
| pic_order_present_flag | 1 | u(1) |
| ........ | | |
| reduced_bit_depth_update_pps_flag | 1 | u(1) |
| reduced_chroma_sampling_update_pps_flag | 1 | u(1) |
| ........ | | |
| } | | |

The semantics of some of the syntax elements included in at least TABLE 3 are as follows:

reduced_bit_depth_update_pps_flag equal to 0 specifies that the reduced bit_depth update mode shall not be applied to P and B slices.

reduced_bit_depth_update_pps_flag equal to 1 specifies that the reduced bit_depth update mode shall be applied to P and B slices.

reduced_chroma_sampling_update_pps_flag equal to 0 specifies that the reduced chroma_sampling update mode shall not be applied to P and B slices.

reduced_chroma_sampling_update_pps_flag equal to 1 specifies that the reduced chroma_sampling update mode shall be applied to P and B slices.

TABLE 4 shows slice header syntax, in accordance with another embodiment of the present principles.

TABLE 4

| slice_header( ) { | C | Descriptor |
|---|---|---|
| first_mb_in_slice | 2 | ue(v) |
| slice_type | 2 | ue(v) |

TABLE 4-continued

| slice_header( ) { | C | Descriptor |
|---|---|---|
| pic_parameter_set_id | 2 | ue(v) |
| frame_num | 2 | u(v) |
| ... | | |
| if(reduced_bit_depth_update_pps_flag) { | | |
| reduced_bit_depth_update_table( ) | | |
| } | | |
| if(reduced_chroma_sampling_update_pps_flag) { | | |
| reduced_chroma_sampling_update_table( ) | | |
| } | | |
| ........ | | |
| } | | |

TABLE 5 shows reduced_bit_depth_update_table syntax, in accordance with an embodiment of the present principles.

TABLE 5

| reduced_bit_depth_update_table( ) { | C | Descriptor |
|---|---|---|
| for( i = 0; i <= num_ref_idx_l0_active_minus1; i++ ) { | | |
| reduced_bit_depth_update_l0_flag | 2 | u(1) |
| if (reduced_bit_depth_update_l0_flag) { | | |
| bit_depth_luma_minus8_l0[i] | 2 | u(ev) |
| bit_depth_chroma_minus8_l0[i] | 2 | u(ev) |
| } | | |
| } | | |
| if( slice_type == B) | | |
| for( i = 0; i <= num_ref_idx_l1_active_minus1; i++ ) { | | |
| reduced_bit_depth_update_l1_flag | 2 | u(1) |
| if (reduced_bit_depth_update_l1_flag) { | | |
| bit_depth_luma_minus8_l1[i] | 2 | u(ev) |
| bit_depth_chroma_minus8_l1[i] | 2 | u(ev) |
| } | | |
| } | | |

The semantics of some of the syntax elements included in TABLE 5 are as follows:

reduced_bit_depth_update_l0_flag equal to 1 specifies that bit_depth information for bit_depth of list 0 prediction is present.

reduced_bit_depth_update_flag equal to 0 specifies that bit_depth information for bit_depth of list 0 prediction is present.

bit_depth_luma_minus_8_l0 [i] is the bit_depth for the luma component for list 0 prediction using RefPicList0 [i].

bit_depth_chroma_minus_8_l0 [i] is the bit_depth for the chroma component for list 0 prediction using RefPicList0 [i].

reduced_bit_depth_update_l1_flag, bit_depth_luma_minus_8_l1 [i], and bit_depth_chroma_minus_8_l1 [i] have the same semantics as reduced_bit_depth_update_l0_flag, bit_depth_luma_minus_8_l0 [i], bit_depth_chroma_minus_8_l0 [i], respectively, with l0, list 0 and List0 replaced by l1, list 1, and List1, respectively.

TABLE 6 shows reduced_chroma_sampling_update_table syntax, in accordance with an embodiment of the present principles.

TABLE 6

| reduced_chroma_sampling_update_table( ) { | C | Descriptor |
|---|---|---|
|     for( i = 0; i <= num_ref_idx_l0_active_minus1; i++ ) { | | |
|         reduced_chroma_sampling_update_l0_flag | 2 | u(1) |
|         if (reduced_chroma_sampling_update_l0_flag) { | | |
|             chroma_format_idc_l0[i] | 2 | u(ev) |
|         } | | |
|     } | | |
|     if( slice_type = = B ) | | |
|         for( i = 0; i <= num_ref_idx_l1_active_minus1; i++ ) { | | |
|             reduced_chroma_sampling_update_l1_flag | 2 | u(1) |
|             if (reduced_chroma_sampling_update_l1_flag) { | | |
|                 chroma_format_idc_l1[i] | 2 | u(ev) |
|             } | | |
|     } | | |
| } | | |

It is to be appreciated that while TABLES 5 and 6 are directed to the use of separate tables for the reduced bit-depth update mode and the reduced chroma sampling update mode, in other embodiments of the present principles, a single table may be used to implemented both the reduced bit-depth update mode and the reduced chroma sampling update mode, while maintaining the spirit of the present principles.

Figure 6:
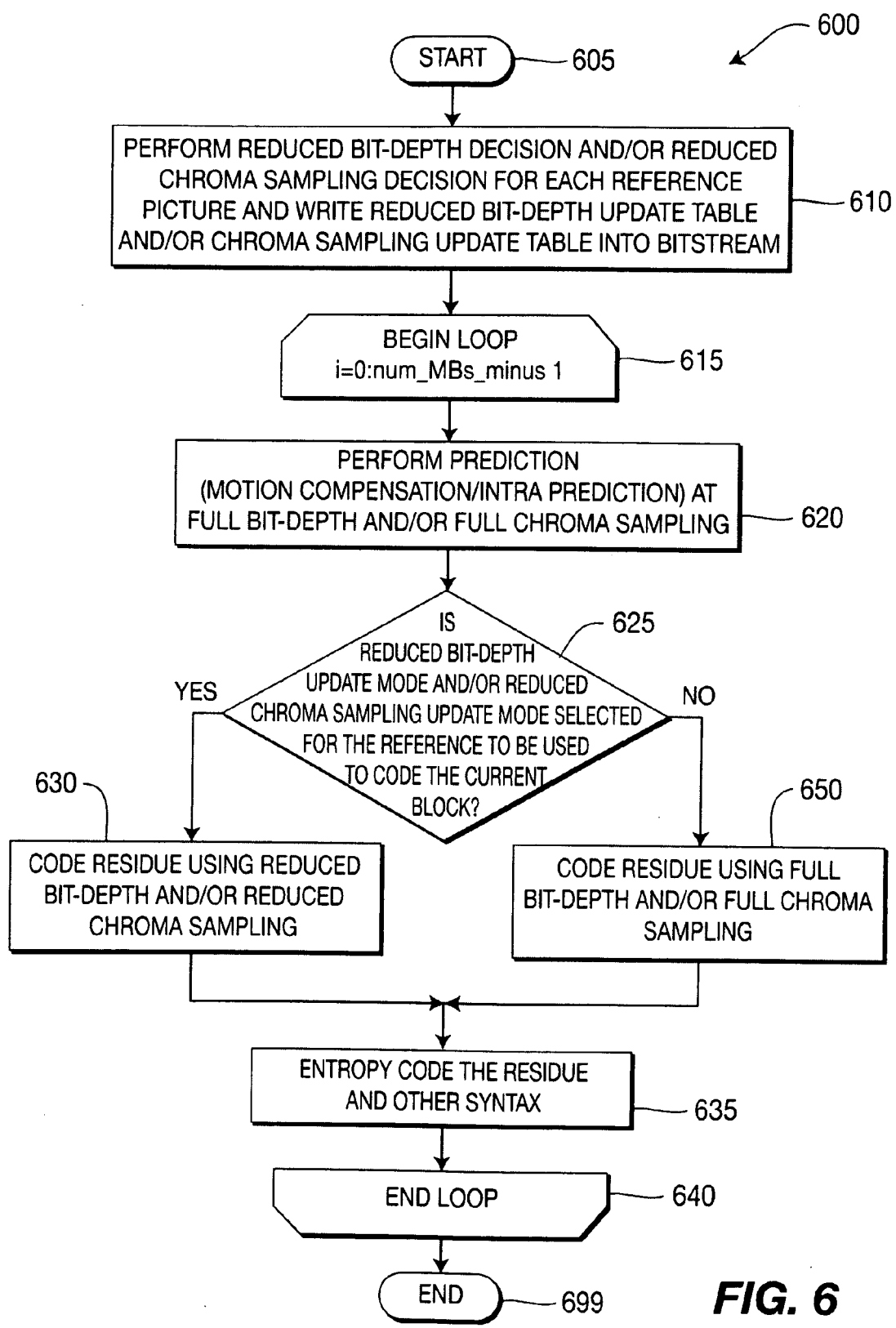
FIG. 6 is flow diagram showing an exemplary for video encoding having a reduced bit-depth update mode and a reduced chroma sampling update mode based on reference index, in accordance with an embodiment of the present principles.

Turning to FIG. 6, an exemplary for video encoding having a reduced bit-depth update mode and a reduced chroma sampling update mode based on reference index is indicated generally by the reference numeral 600. The method 600 includes a start block 605 that passes control to a function block 610. The function block 610 performs a reduced bit-depth decision process and/or reduced chroma sampling decision process for each reference picture, writes a reduced bit-depth update table and/or a reduced chroma sampling update table into a corresponding bitstream, and passes control to a loop limit block 615. The loop limit block 615 begins a loop over each macroblock in a current picture to be encoded, using a variable i with a range from zero to num_MBs_minus1 and passes control to a function block 620. The function block 620 performs prediction (motion compensation/intra prediction) using a full bit-depth and/or full chroma sampling, and passes control to a decision block 625. The decision block 625 determines whether or not the reduced bit-depth update mode and/or the reduced chroma sampling update mode is selected for the reference index to be used to code the block. If so, then control is passed to a function block 630. Otherwise, control is passed to a function block 650.

The function block 630 codes the residue using a reduced bit-depth and/or reduced chroma sampling, and passes control to a function block 635.

The function block 635 entropy encodes the residue and other syntax, and passes control to a loop limit block 640. The loop limit block 640 ends the loop, and passes control to an end block 699.

The function block 650 codes the residue using a full bit-depth and/or full chroma sampling, and passes control to the function block 635.

Figure 7:
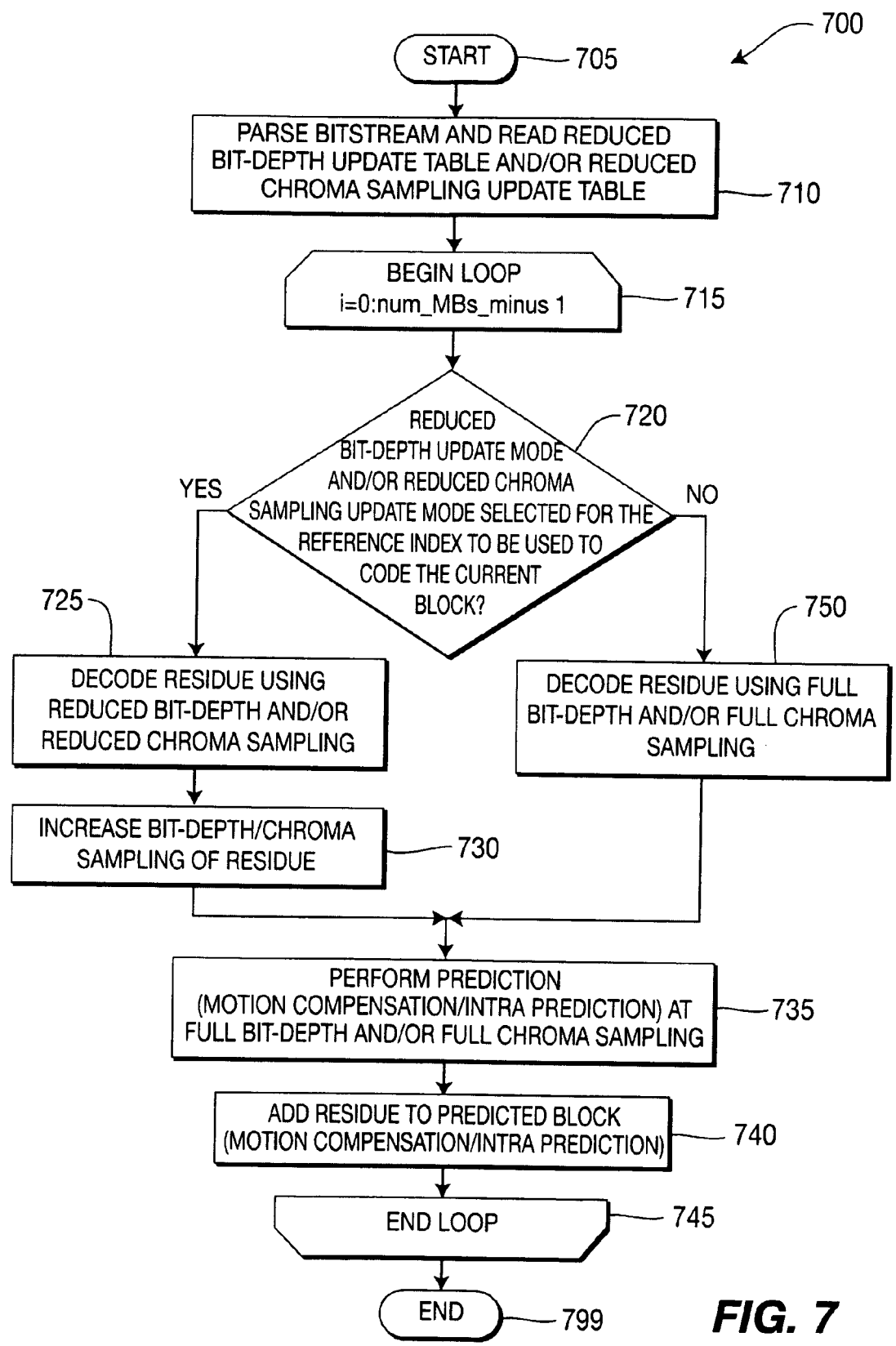
FIG. 7 is a flow diagram showing an exemplary method for video decoding having a reduced bit-depth update mode and a reduced chroma sampling update mode based on reference index, in accordance with an embodiment of the present principles.

Turning to FIG. 7, an exemplary method for video decoding having a reduced bit-depth update mode and a reduced chroma sampling update mode based on reference index is indicated generally by the reference numeral 700. The method 700 includes a start block 705 that passes control to a function block 710. The function block 710 parses the bitstream, reads a reduced bit-depth update table and/or a reduced chroma sampling update table, and passes control to a loop limit block 715. The loop limit block 715 begins a loop over each macroblock in a current picture to be encoded, using a variable i with a range from zero to num_MBs_minus1, and passes control to a decision block 720. The decision block 720 determines whether or not the reduced bit-depth update mode and/or the reduced chroma sampling update mode is selected for the reference index to be used to code the block. If so, then control is passed to a function block 725. Otherwise, control is passed to a function block 750.

The function block 725 decodes the residue using a reduced bit-depth and/or reduced chroma sampling, and passes control to a function block 730. The function block 730 increases the bit-depth and/or chroma sampling of the residue, and passes control to a function block 735.

The function block 735 performs prediction (motion compensation/intra prediction) using a full bit-depth and/or full chroma sampling, and passes control to a function block 740. The function block 740 adds the residue to the predicted block (obtained using motion compensation/intra prediction), and passes control to a loop limit block 745. The loop limit block 745 ends the loop, and passes control to an end block 799.

The function block 750 decodes the residue using a full bit-depth and/or full chroma sampling, and passes control to the function block 735.

A description will now be given of some of the many attendant advantages/features of the present invention, some of which have been mentioned above. For example, one advantage/feature is an apparatus having an encoder for encoding at least a portion of a picture using at least one of a reduced bit-depth update mode and a reduced chroma sampling update mode that respectively reduces at least one of a bit-depth and a chroma sampling of a residue signal corresponding to the portion.

Another advantage/feature is the apparatus having the encoder as described above, wherein at least one of intra prediction and motion compensation are performed for the portion using at least one of a full bit-depth and a full chroma-sampling.

Yet another advantage/feature is the apparatus having the encoder wherein at least one of intra prediction and motion compensation are performed as described above, wherein the portion is reconstructed by increasing the at least one of the bit-depth and the chroma sampling of the residue signal.

Still another advantage/feature is the apparatus having the encoder as described above, wherein the encoder signals parameters for at least one of the reduced bit-depth update mode and the reduced chroma sampling update mode to a corresponding decoder at least one of a macroblock level, a slice level, a picture level, and a sequence level.

Moreover, another advantage/feature is the apparatus having the encoder a described above, wherein the signaled parameters are associated with at least one a reference picture and a reference picture list.

Further, another advantage/feature is the apparatus having the encoder as described above, wherein at least one of the reduced bit-depth update mode and the reduced chroma sampling update mode is enabled based on at least one of a coded picture type and picture characteristics.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus for video encoding, comprising:
an encoder for encoding at least a portion of a picture in video encoding that provide a single bitstream for the picture, wherein the encoder, if the picture is a predesignated reference picture, encodes the portion using at least one of a full bit-depth and a full chroma-sampling, and if the picture is not the reference picture, encodes the portion using at least one of a reduced bit-depth update mode and a reduced chroma sampling update mode that respectively reduces at least one of a bit-depth and a chroma sampling of a residue signal corresponding to the portion,
wherein at least one of intra prediction and motion compensation are performed for the portion using at least one of a full bit-depth and a full chroma-sampling and wherein the portion is reconstructed by increasing the at least one of the bit-depth and the chroma sampling of the residue signal.

2. The apparatus of claim 1, wherein said encoder signals parameters for at least one of the reduced bit-depth update mode and the reduced chroma sampling update mode to a corresponding decoder at least one of a macroblock level, a slice level, a picture level, and a sequence level.

3. The apparatus of claim 2, wherein the signaled parameters are associated with at least one of the reference picture and a reference picture list.

4. The apparatus of claim 1, wherein at least one of the reduced bit-depth update mode and the reduced chroma sampling update mode is enabled based on at least one of a coded picture type and picture characteristics.

5. A method for video encoding, comprising:
encoding at least a portion of a picture in video encoding that provide a single bitstream for the picture, wherein if the picture is a predesignated reference picture, the portion is encoded using at least one of a full bit-depth and a full chroma sampling, and if the picture is not the reference picture, the portion is encoded using at least one of a reduced bit-depth update mode and a reduced chroma sampling update mode that respectively reduces at least one of a bit-depth and a chroma sampling of a residue signal corresponding to the portion,
wherein at least one of intra prediction and motion compensation are performed for the portion using at least one of the full bit-depth and the full chroma-sampling and wherein the portion is reconstructed by increasing the at least one of the bit-depth and the chroma sampling of the residue signal.

6. The method of claim 5, wherein said encoding step comprises signaling parameters for at least one of the reduced bit-depth update mode and the reduced chroma sampling update mode to a corresponding decoder at least one of a macroblock level, a slice level, a picture level, and a sequence level.

7. The method of claim 6, wherein the signaled parameters are associated with at least one of the reference picture and a reference picture list.

8. The method of claim 5, wherein at least one of the reduced bit-depth update mode and the reduced chroma sampling update mode is enabled based on at least one of a coded picture type and picture characteristics.

9. An apparatus for video decoding, comprising:
a decoder for decoding at least a portion of a picture from a single bitstream compressed using a video compression scheme that provides only the single bitstream for the picture, wherein the decoder, if the picture is a predesignated reference picture, decodes the portion using at least one of a full bit-depth and a full chroma sampling, and if the picture is not the reference picture, decodes the portion using at least one of a reduced bit-depth update mode and a reduced chroma sampling update mode that respectively increases at least one of a bit-depth and a chroma sampling of a residue signal corresponding to the portion,
wherein at least one of intra prediction and motion compensation are performed for the portion using at least one of the full bit-depth and the full chroma-sampling and wherein the portion reconstructed by increasing the at least one of the bit-depth and the chroma sampling of the residue signal.

10. The apparatus of claim 9, wherein said decoder at least one of decodes and derives parameters for at least one of the reduced bit-depth update mode and the reduced chroma sampling update mode from at least one of a macroblock level, a slice level, a picture level, and a sequence level.

11. The apparatus of claim 10, wherein the parameters are associated with at least one a reference picture and a reference picture list.

12. The apparatus of claim 9, wherein at least one of the reduced bit-depth update mode and the reduced chroma sampling update mode is enabled based on at least one of a coded picture type and picture characteristics.

13. A method for video decoding, comprising:
decoding at least a portion of a picture from a single bitstream compressed using a video compression scheme that provides only the single bitstream for the picture, wherein if the picture is a predesignated reference picture, the portion is decoded using at least one of a full bit-depth and a full chroma sampling, and if the picture is not the reference picture, the portion is decoded using at least one of a reduced bit-depth update mode and a reduced chroma sampling update mode that respectively increases at least one of a bit-depth and a chroma sampling of a residue signal corresponding to the portion,
wherein at least one of intra prediction and motion compensation are performed for the portion using at least one of the full bit-depth and the full chroma-sampling and wherein the portion reconstructed by increasing the at least one of the bit-depth and the chroma sampling of the residue signal.

14. The method of claim 13, wherein said decoding step comprises at least one of decoding and deriving parameters for at least one of the reduced bit-depth update mode and the reduced chroma sampling update mode from at least one of a macroblock level, a slice level, a picture level, and a sequence level.

15. The method of claim 14, wherein the parameters are associated with at least one a reference picture and a reference picture list.

16. The method of claim 13, wherein at least one of the reduced bit-depth update mode and the reduced chroma sampling update mode is enabled based on at least one of a coded picture type and picture characteristics.

* * * * *